United States Patent [19]

Khait et al.

[11] 4,402,588
[45] Sep. 6, 1983

[54] AUTOMATIC PHOTOGRAPH LABELER EMPLOYING CAMERA WITH PASSIVE DISPLAY

[75] Inventors: George Khait, San Francisco County; William R. Fish, Santa Clara County, both of Calif.

[73] Assignee: Electro Mechanical Industries, Inc., Concord, Calif.

[21] Appl. No.: 296,017

[22] Filed: Aug. 25, 1981

[51] Int. Cl.³ .............................................. G03B 17/24
[52] U.S. Cl. .................................................... 354/106
[58] Field of Search ....................... 354/105, 109, 106

[56] References Cited

U.S. PATENT DOCUMENTS

| 3,788,201 | 1/1974 | Abell | 95/1.1 |
| 3,858,967 | 1/1975 | O'Donnell | 352/38 |
| 3,889,281 | 6/1975 | Taguchi et al. | 354/109 |
| 3,953,868 | 4/1976 | Kawamura et al. | 354/109 |
| 4,025,932 | 5/1977 | Miyagawa | 354/109 |
| 4,040,723 | 8/1977 | Groeneweg | 350/203 |
| 4,168,894 | 9/1979 | Adolph | 354/105 |
| 4,183,645 | 1/1980 | Ohmura et al. | 354/109 |
| 4,199,242 | 4/1980 | Hosomizu et al. | 354/145 |
| 4,265,526 | 5/1981 | Veda et al. | 354/109 |

FOREIGN PATENT DOCUMENTS

| 2751574 | 5/1978 | Fed. Rep. of Germany | 354/106 |
| 2710735 | 9/1978 | Fed. Rep. of Germany | 354/106 |
| 56-89733 | 7/1981 | Japan | 354/106 |
| 56-94342 | 7/1981 | Japan | 354/109 |
| 56-94343 | 7/1981 | Japan | 354/106 |

Primary Examiner—Russell E. Adams
Attorney, Agent, or Firm—David Pressman

[57] ABSTRACT

A camera (10) has a passive display device, preferably a liquid crystal display panel (26), positioned in front of one edge of the film (24), in the path of light directed at the film from the lens and shutter assembly (12). The display is driven by a clock or other control circuit (28), also in the camera, with controls (30) on the outside of the camera so as to display the date and time, or other selected indicia, continuously, whereby light entering the camera upon taking a picture will cause the display to cast a shadow (40') of the indicia onto the film, thereby automatically to label the film. The clock circuit and display may be arranged as a retrofit device (44-50) for an existing camera. A second display (34) with identical indicia may be arranged to provide a readout in the viewfinder (20) to indicate to the photographer how the labeled photography will appear. The camera may also contain a light source (54) for illuminating the readout from the front thereof. The readout may be mounted in front of the film plane in any of a variety of positions, or a plurality of readouts in a plurality of positions may be employed.

13 Claims, 11 Drawing Figures

SECTION OF SLR CAMERA WITH FILM AND VIEWING SCREEN READOUTS

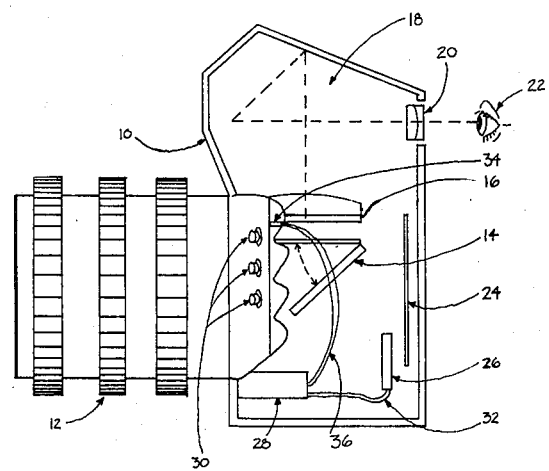
FIG. 1 SECTION OF SLR CAMERA WITH FILM AND VIEWING SCREEN READOUTS
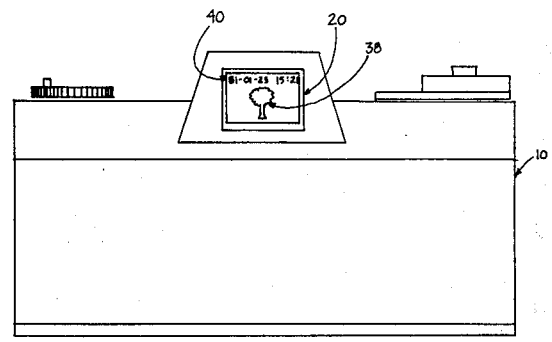
FIG. 2 BACK OF FIG. 1 CAMERA SHOWING DATE & TIME READOUT IN VIEWFINDER

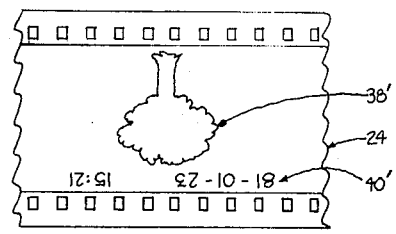
FIG. 3 FILM WITH PROJECTED TIME INDICIA
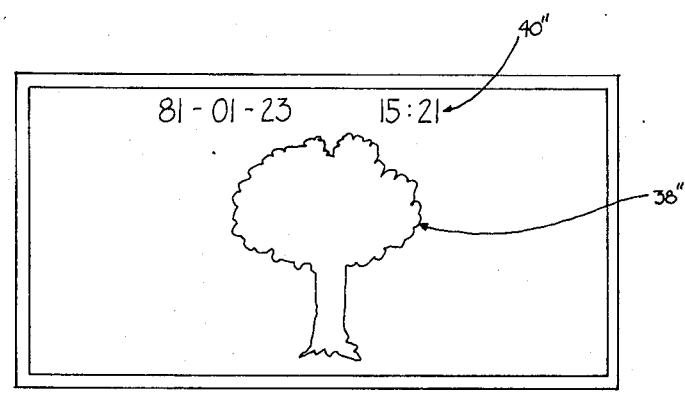
FIG. 4 POSITIVE PRINT WITH RECORDED TIME INDICIA
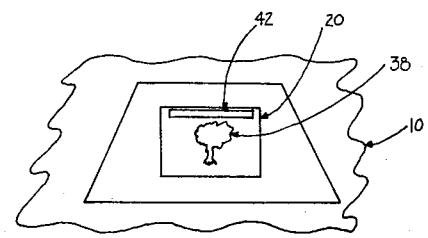
FIG. 5 VIEWFINDER WITH OUTLINED READOUT AREA

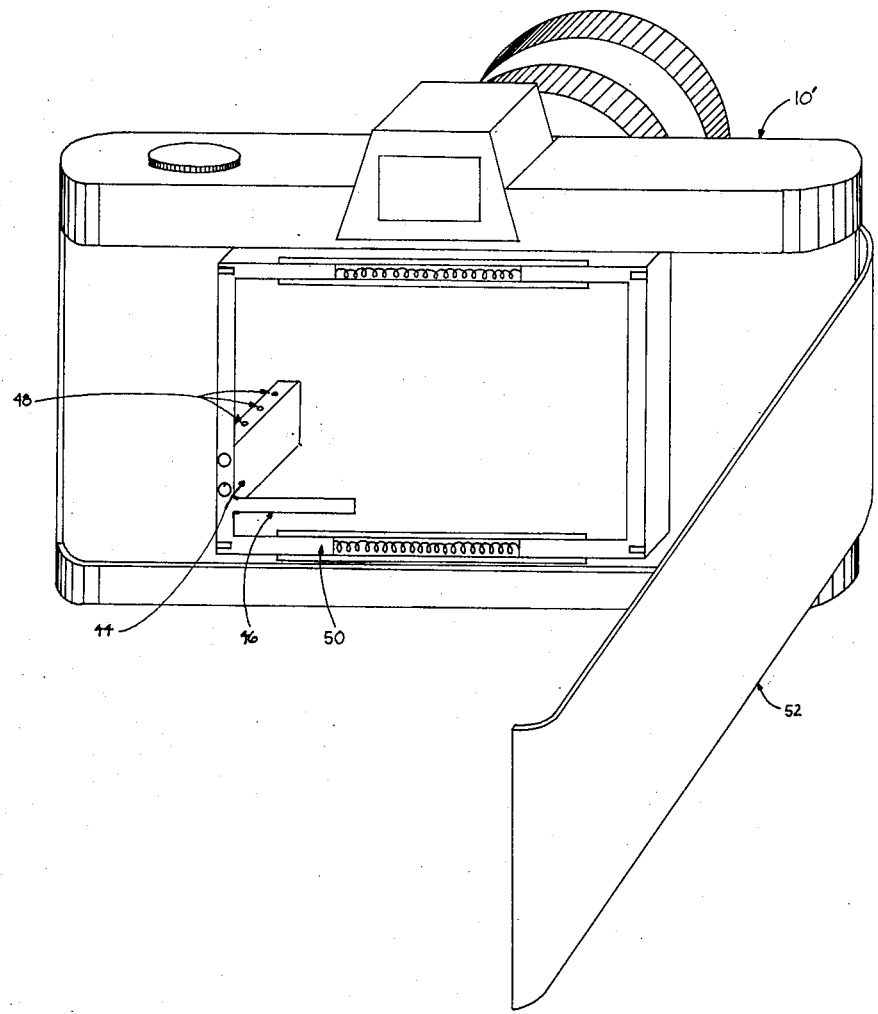
FIG. 6 CAMERA WITH RETROFITTED TIME LABELER

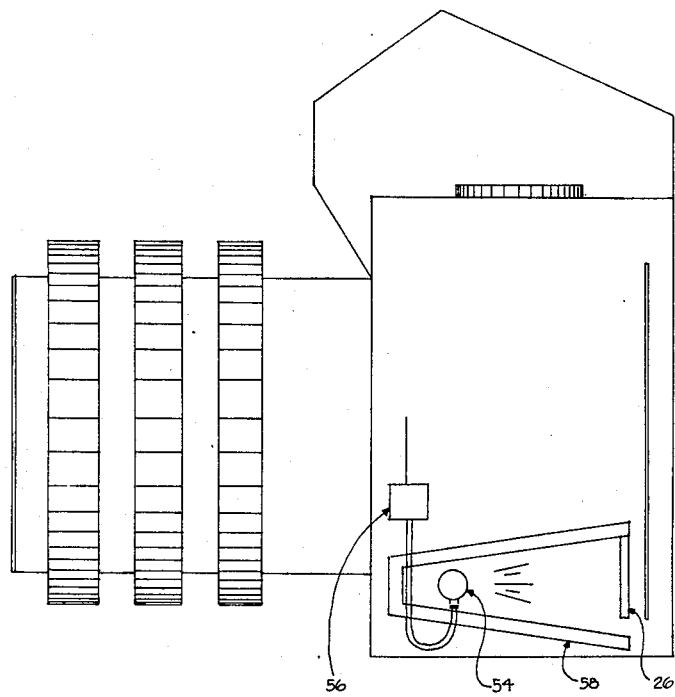
FIG. 7 SECTION OF SLR CAMERA WITH ILLUMINATED LCD READOUT

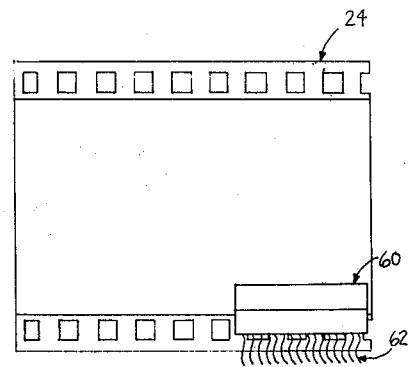
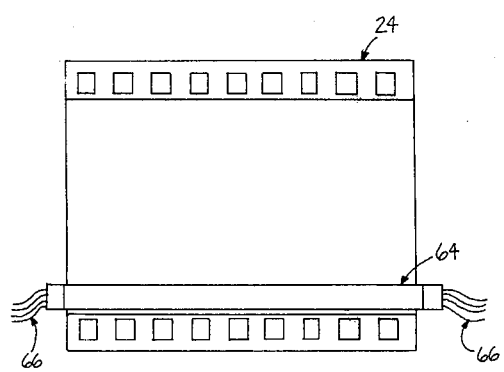
FIG 8 CORNER DISPLAY ONE SIDED CONNECTOR
FIG 9 BOTTOM DISPLAY TWO SIDED CONNECTOR
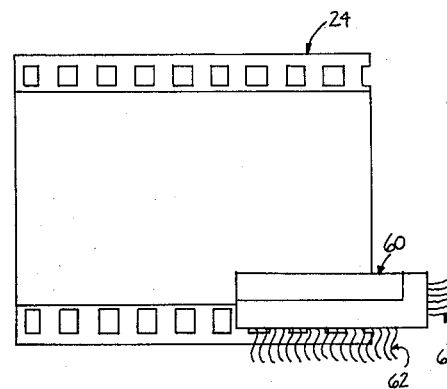
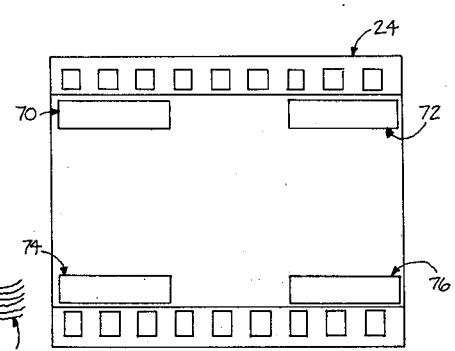
FIG 10 CORNER DISPLAY TWO SIDED CONNECTOR
FIG 11 FOUR CORNER DISPLAYS

AUTOMATIC PHOTOGRAPH LABELER EMPLOYING CAMERA WITH PASSIVE DISPLAY

BACKGROUND—FIELD OF INVENTION

This invention relates to photography, particularly to a mechanism for automatically labeling photographs with time or other information.

BACKGROUND—DESCRIPTION OF PRIOR ART

Heretofore, devices have been provided within cameras for automatically adding characters to a photograph to indicate the time (date or time of day) the photograph was taken. One such device labeled the film in the camera with a binary code indicative of the time at which the photograph was taken. Another used a lamp responsive to an electric shutter signal to illuminate a data source as the photograph is taken. Still another used numeral indicating lamps inside the camera to expose the film with time information.

These schemes have suffered from several disadvantages. The clock or time readout mechanisms were awkward, large, heavy, and consumed much energy. Also, the numeral-indicating lamp sources had to be manually turned on or precisely adjusted for the speed or sensitivity of the film under consideration, i.e., the brightness and "on" time of the lamps must be controlled so as to not under- or over-expose the film. The time and date readouts had to be turned on or precisely synchronized with the shutter, thereby requiring awkward, expensive, and fallible control mechanisms, in addition to the time-display mechanism. Separate lenses also were necessary to focus light from the time display precisely onto the film. Also the time display exposed and blanked out a relatively large portion of the film in order to record numbers thereon, thereby substantially detracting from the photograph. The prior-art labeling displays were not versatile, i.e., they were available in only one color, which often clashed with the color of the photograph being taken, and were available only in a "positive" readout form and not with reverse characters. Also, prior-art labeling devices were not capable of being retrofitted to existing cameras. Lastly, prior-art labeling displays had to be precisely positioned directly adjacent to the film since such displays comprised light sources of their own and provided generally highly-divergent rays which were not effective unless they were directly adjacent to film or precisely focused with an array of lenses.

The present invention avoids all of the above drawbacks by providing an automatic photograph time labeler which is lighter, less expensive, more reliable, more energy efficient, provides a readout in a neutral, unobtrusive color, does not require focusing lenses, does not require awkward synchronization circuits, is available with either positive or reverse characters, can be retrofitted easily to existing cameras, does not have to be precisely positioned with respect to any film, and which uses only a relatively small area of the film to record time indicia thereon. The above and further objects and advantages of the invention will become apparent from a consideration of the ensuing description.

DRAWINGS

FIG. 1 is a cross-sectional view of a SLR camera employing film and viewing screen displays according to the invention.

FIG. 2 is a back view of the camera of FIG. 1 showing the time readout in the camera's viewfinder.

FIG. 3 shows a portion of the film in the camera of FIG. 1 with projected time indicia thereon.

FIG. 4 shows a positive print, made by the camera of FIG. 1, with recorded time indicia thereon.

FIG. 5 shows another embodiment of the invention, a camera without a viewfinder display, but having an outlined readout area in its viewfinder.

FIG. 6 shows a camera retrofitted with a time labeler according to the invention.

FIG. 7 shows a section of an SLR camera with an illuminated LCD readout.

FIGS. 8, 9, 10, and 11 show various alternative forms of film labelers in accordance with the invention.

FIGS. 1–4—SLR CAMERA WITH FILM AND VIEWING SCREEN READOUTS

The SLR (single lens reflex) camera 10 of FIG. 1 comprises the usual lens arrangement 12, pivotable mirror 14, viewing screen 16, lens and pentaprism arrangement 18, and viewfinder 20, which is viewed by an eye 22 of an observer. The camera contains a conventional film transport mechanism (not shown) which is arranged to transport film, shown in section at 24, across the back of camera 10, behind mirror 14, and also behind a focal plane shutter (not shown) which is positioned between mirror 14 and film 22.

Camera 10 operates conventionally as follows: Light entering the camera through lenses 12 is focused and reflected from mirror 14 onto view screen 17 where an image of the object to be photographed is provided. The image is viewed by eye 22 via viewfinder 20 and pentaprism and lens arrangement 18. When a picture is taken, a shutter button (not shown) is operated, causing mirror 14 to flip briefly to a horizontal position and the focal plane shutter (not shown) to open, whereby light proceeds directly through lenses 12 onto film 22. Thereafter, the shutter closes and mirror 14 returns to its olique position, so that viewfinder 20 will be useable again.

In accordance with the invention, camera 10 also includes a time-labeling LCD (liquid crystal display) 26 which is a transparent panel which continually displays translucent or opaque characters indicative of the date and time of day. Display 26 is driven by a conventional electronic clock driver 28 which contains an energy cell (not indicated) and which is set by means of push button controls 30 on the outside of camera 10. Display 26 is connected to driver circuit 28 by means of wires 32. In addition, a second, duplicate viewing screen display 34 is provided under viewing screen 16 to provide the time information adjacent to viewing screen 16 so that it can be seen by the photographer. Viewing screen display 34 is connected to clock driver 28 by means of wires 36.

Clock driver 28 and readouts 26 and 34, as well as puch buttons 30, are conventional; standard wrist watch components may be used therefor. In lieu of the projecting push buttons 30 shown, recessed push buttons, operable by a ball-point pen or other sharp instrument, may be used.

FIG. 2 shows the back of the camera of FIG. 1. Viewfinder 20 is displaying a typical image, a tree 38.

Above tree 38, date and time indicia 40 are provided from viewing screen display 34 (FIG. 1) which is illuminated by light entering through lenses 12. To conserve space and avoid ambiguity, the date is indicated in the logical descending numerical order in accordance with International Standard ISO 2014-1976. In addition, only the last two digits of the year are given so that the date appears as follows: "81-01-23" meaning Jan. 23, 1981. The time is given in the European/military 24-hour format to avoid the need for commas and a.m. or p.m. indicators. Thus the time indicated, "15:21", means 3:21 p.m. However, it will be appreciated that in lieu of the ISO and European/military time formats indicated, various other date and time formats can be used. Also while date and time information is used, only date information can be provided in order to have a smaller display. The word "time" as used in the claims thereby includes the time of day as well as date, since a date is actually a species of time.

As indicated, film display 26 (FIG. 1) also provides date and time information identical to that provided by viewing screen readout 34. Light entering the camera and reflected from mirror 14 in its normal, olique, rest position will cause viewing screen readout 34 to cast a shadow upon viewing screen 16, such that the date and time indicia 40 appear as in FIG. 2. However, when a photograph is taken and mirror 14 flips to its horizontal position briefly and the shutter opens, light will be allowed to pass from lens 12 under the now horizontal position of mirror 14 directly onto film 24. A portion of the light will pass through film readout 26, causing it to cast a shadow upon film 24. As indicated in FIG. 3, the image photographed, tree 38, will appear projected onto the film in upside-down reverse format as indicated at 38', so that film readout 26 should also be arranged to provide an upside-down, reverse format so that the date and time indicia will be correctly projected with respect to image 38.

Regardless of the film speed, the lens aperture, or the time of exposure used, film display 26 will be illuminated with the quantity of light which provides a properly exposed image, as indicated at 40', since the photographer will adjust the various parameters to interrelate correctly with each other.

When the negative film of FIG. 3 is developed and a print is made thereof, the print will appear as in FIG. 4 with tree 38" in upright position and date and time indicia 40" in an upright, non-reversed position. It will be noted that the print is permanently marked with the date and time at which it was taken by means of unambiguous, yet non-obtrusive indicia 40".

If it is desired to take a picture without any date and time indicia 40" thereon, one of switches 30 can be employed as a shut-off switch to turn off the displays so that the LCD panel will become transparent and will not provide any indicia on the negative or positive.

FIG. 5—VIEWFINDER WITH OUTLINED READOUT AREA

As an economical alternative embodiment, the camera can be provided with just film readout 26, with viewing screen readout 34 eliminated, thereby saving the cost of duplicate readouts. In order to indicate the location on the print at which the date and time indicia will appear, the readout area is permanently outlined, either by means of markings upon viewing screen 16 or on viewfinder 20, as indicated at 42, so that the photographer will not position any crucial information in this area when the image is framed.

FIG. 6—CAMERA WITH RETROFITTED TIME LABELER

In order to provide a time labeler according to the invention for existing cameras, a retrofittable device may be employed as indicated in FIG. 6. A standard SLR camera is shown at 10'. A retrofittable film labeling device consisting of a clock driver 44 (including an energy cell—not indicated) and a physically-attached LCD film display panel 46 are positioned in front of the normal film plane so as to cast a shadow of the date and time indicia provided by LCD panel 46 onto the film (not shown). Clock driver 44 has the usual momentary control buttons 48 similar to buttons 30 of FIG. 1 for adjusting the date and time on panel 46.

Readout assembly 44/46 is held in position within camera 10' by means of any suitable mounting mechanism, such as a frame and spring arrangement 50 which is arranged to be positioned inside the back of camera 10' and to which is attached assembly 44/46 in correct position to be held adjacent or close to the film when back 52 of camera 10' is closed and the film is positioned therein. Frame and spring assembly 50 can easily be removed by compressing together the two C-shaped frame pieces and withdrawing it directly out of the back of camera 10'.

FIG. 7

As an alternative embodiment of the invention, film readout 26 may be provided with its own illumination source 54, which may be an incandescent bulb, a light-emitting diode (LED), a photoluminescent panel, or any other suitable light-emitting source. As with previous embodiments, film display 26 is constantly energized—this is possible because LCD's consume little energy—to provide a continuous time and date indication. However, because of its relatively large energy consumption, source 54 is energized only when a picture is taken. Thus in lieu of a clock driver, a clock and illumination source driver 56 is provided which is connected to the shutter control so as to energize light source 54 only when the shutter is operated. Driver 56 also energizes film readout 26 continuously. A light shield 58 may be provided around source 54 and film readout 26 to prevent stray light from blurring the film.

The illuminated LCD labeler of FIG. 7 is most suitable for applications where highly sensitive film, which is designed for use under extremely low light conditions, is used.

FIGS. 8-11—VARIOUS DISPLAYS

Various types of film labeling displays may be employed in accordance with the invention. In order to provide the least obtrusive possible labeling, a corner display 60 as shown in FIG. 8 is most advantageous; this diaplay is shown with a one-sided electrical connector whereby a plurality of driving wires 62 are connected to the bottom of display 60.

In FIG. 9 a display 64 is provided which is long enough to cover the entire bottom portion of film 24 and which has wires 66 connected to the respective ends thereof.

In FIG. 10 a corner display 60 similar to that of FIG. 8 is shown; however, in lieu of a one-sided connector, wires are connected to the right and bottom sides of the display at 62 and 68.

In FIG. 11, four displays (60, 62, 74, and 76) are provided and a four-position switch (not shown) is also provided on the outside of camera 10 so that either of these four displays can be selectively energized. Thereby any corner of the film can be labeled so as to provide the least possible interference with the photograph taken. Four corresponding viewing screen displays may also be provided in order to provide the photographer with a correct preview of the labeled photograph.

By the use of a passive (non-light-emissive) display panel, the panel can be illuminated by the light of the image photographed, which has relatively non-divergent rays, whereby the distance from the panel to the film need not be precise to obtain sharp labeling indicia. Also the passive (LCD) display consumes little energy, so that a large energy source within the camera need not be employed. Also, since shutter and lens aperture-controlled light, which is preadjusted for the film and speed used, illuminates the display panel, the panel is compatible with almost all film speeds. No lenses are required for the LCD panel because of its non-critical positioning. The LCD panel can be arranged to provide a reversed or positive image for labeling of negatives and slides. The LCD provides labeling in a non-obtrusive, neutral (gray) color which is compatible with all image colors. Lastly, since the LCD consumes minimal energy, it can be left energized all the time, thereby making a retrofit device possible since no external on-off switch is required, and also avoiding the need for turn-on synchronization circuitry.

While the above description contains many specificities, these should not be construed as limitations upon the scope of the invention, but rather as an exemplification of several preferred embodiments thereof. Various other embodiments and ramifications will be apparent to those skilled in the art. For example, in lieu of an SLR camera, the labeling system of the invention can be provided in any other type of camera. In lieu of an LCD display, any other passive display, such as an analogue clock with a transparent face and rotary radial hands can be provided. In addition to time and date indicia, the LCD panel can also provide other indicia such as an arrow, the position of which is adjustable across the entire film area by means of external controls on the camera in order to point out an item in the photograph of particular interest. In this case the LCD panel would be as large as the film area normally illuminated by the camera. Also in lieu of time indicia, the display can be arranged to provide selectable alphanumeric or other humanly-readable indicia to label the photograph with a location, a name, etc.

We claim:

1. A camera with means for automatically labeling the film therein, comprising:
   a camera enclosure,
   film-holding means for holding film in a light-receiving position within said camera,
   a lens-shutter assembly for admitting light from outside said camera enclosure into said camera enclosure and focussing said light at said light-receiving position,
   passive display means positioned in said camera between said film and said lens-shutter assembly for providing humanly-readable indicia when illuminated by a source of light separate from said passive display means,
   said indicia comprising characters and spaces therebetween, said characters being controllable and capable of casting a shadow onto said film when illuminated by said light from outside said camera enclosure and coming through said lens-shutter assembly to said light-receiving position,
   whereby said passive display means can be made without focussing lenses so it will be small enough to be retrofittable into existing cameras and will not have to be precisely-positioned in front of said film, and whereby data from daid passive display means can be recorded onto said film without the need for any separate internal light source which requires extra power and tends to fog said film.

2. The camera of claim 1 where said passive display means is capable of displaying the date and time of day, and further including clock means for providing an electronic control signal indicative of the date and time of day to said display means.

3. The camera of claim 1, further including clock control means on an external surface of said camera for setting the time and date displayed by said display means.

4. The camera of claim 1 wherein said display means is positioned adjacent said film and in the path of light normally admitted into said camera by said lens-shutter assembly, one of said characters or spaces being light-transparent and the other being sufficiently non-transmissive of light so as to be capable of casting a shadow from said light normally admitted into said camera and focussed onto said film.

5. The camera of claim 1, further including clock means for supplying an electronic control signal to said display means, said clock means and said display means being self-contained and removable from said camera, thereby to provide a retrofittable-assembly for adding a time-recording feature to an existing camera.

6. The camera of claim 1, further including a light source positioned in said camera on the side of said display means opposite to the side thereof facing said film, whereby said display means can be illuminated from within said camera so as to be able to cast a shadow onto said film even in the presence of low external light conditions.

7. The camera of claim 6, further including means for energizing said light source upon operation of the shutter of said camera.

8. The camera of claim 1 wherein said display means is positioned in one corner of the film frame area normally exposed upon operation of said camera.

9. The camera of claim 1 wherein said display means is positioned across one side of the film frame normally exposed upon operation of said camera.

10. The camera of claim 1 wherein said display means comprises a plurality of separate displays, positioned at respectively opposite sides of the film frame area normally exposed upon operation of said camera.

11. The camera of claim 1 wherein said display means comprises a liquid crystal display panel.

12. The camera of claim 1, further including second display means positioned in said camera to provide a display substantially identical to said first-named display means, said second display means being positioned in an area of said camera where it can be viewed by an operator of said camera.

13. The camera of claim 12 wherein said camera is a single-lens reflex camera, said first-named display means is positioned adjacent the normal light-receiving position in said camera, and said second display means is positioned adjacent the viewing screen of said camera.

* * * * *